US008886010B2

(12) United States Patent
Jung et al.

(10) Patent No.: US 8,886,010 B2
(45) Date of Patent: Nov. 11, 2014

(54) APPARATUS AND METHOD FOR DECODING DATA FOR PROVIDING BROWSABLE SLIDE SHOW, AND DATA STORAGE MEDIUM THEREFOR

(75) Inventors: Kil-soo Jung, Hwaseong-gun (KR); Seong-jin Moon, Suwon-si (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 487 days.

(21) Appl. No.: 13/229,316

(22) Filed: Sep. 9, 2011

(65) Prior Publication Data
US 2012/0002942 A1  Jan. 5, 2012

Related U.S. Application Data

(63) Continuation of application No. 10/937,502, filed on Sep. 10, 2004, now Pat. No. 8,131,129, which is a continuation of application No. 10/783,038, filed on Feb. 23, 2004, now Pat. No. 8,103,145.

(60) Provisional application No. 60/452,559, filed on Mar. 7, 2003.

(30) Foreign Application Priority Data

Feb. 24, 2003 (KR) .................................. 2003-11520
Jan. 2, 2004 (KR) ...................................... 2004-59

(51) Int. Cl.
H04N 5/94 (2006.01)
G11B 27/10 (2006.01)
(Continued)

(52) U.S. Cl.
CPC .......... *G11B 20/10527* (2013.01); *G11B 27/10* (2013.01); *G11B 2020/10944* (2013.01); *H04N 21/4341* (2013.01); *H04N 21/8153* (2013.01); *G11B 2220/2562* (2013.01); *H04N 21/2368* (2013.01); *G11B 2020/10546* (2013.01); *H04N 21/4325* (2013.01); *H04N 21/4307* (2013.01)
USPC ........................................... 386/246; 386/248

(58) Field of Classification Search
CPC combination set(s) only.
See application file for complete search history.

(56) References Cited

U.S. PATENT DOCUMENTS 5,281,755 A   1/1994  Matsui et al.
5,923,869 A   7/1999  Kashiwagi et al.
(Continued)

FOREIGN PATENT DOCUMENTS

EP   1 041 566 A1   10/2000
EP   1 128 386 A2   8/2001
(Continued)

OTHER PUBLICATIONS

Japanese Office Action mailed Aug. 7, 2012, issued in counterpart Japanese Patent Application No. 2010-132326; 2 pages in Japanese language.

(Continued)

*Primary Examiner* — William C Vaughn, Jr.
*Assistant Examiner* — Eileen Adams
(74) *Attorney, Agent, or Firm* — NSIP Law

(57) ABSTRACT

A decoding apparatus and method for producing a browsable slide show and a data storage medium therefor. The decoding apparatus having a mainstream decoder, which decodes mainstream packet data including image data to be reproduced in a browsable slide show; a sub-audio decoder, which decodes sub-audio packet data including audio data attached to the image data; a mainstream system time clock (STC) counter, which provides an STC sequence for controlling the decoding time of the mainstream packet data to the mainstream decoder; and a sub-audio STC counter, which provides an STC sequence for controlling the decoding time of the sub-audio packet data to the sub-audio decoder. Accordingly, it is possible to seamlessly reproduce sub-audio data even when a user selects a forward or reverse play in the middle of reproducing still image data with the sub-audio data attached thereto in a browsable slide show.

1 Claim, 16 Drawing Sheets

(51) Int. Cl.
*G11B 20/10* (2006.01)
*H04N 21/434* (2011.01)
*H04N 21/81* (2011.01)
*H04N 21/2368* (2011.01)
*H04N 21/432* (2011.01)
*H04N 21/43* (2011.01)

(56) References Cited

U.S. PATENT DOCUMENTS

| | | | |
|---|---|---|---|
| 5,930,450 A | 7/1999 | Fujita | |
| 6,101,591 A | 8/2000 | Foster et al. | |
| 6,230,162 B1 * | 5/2001 | Kumar et al. | 382/240 |
| 6,574,419 B1 | 6/2003 | Nonomura et al. | |
| 6,975,363 B1 * | 12/2005 | Baldwin et al. | 348/512 |
| 7,236,531 B1 | 6/2007 | Gotoh et al. | |
| 8,041,179 B2 | 10/2011 | Seo et al. | |
| 8,131,129 B2 * | 3/2012 | Jung et al. | 386/200 |
| 2001/0017975 A1 | 8/2001 | Ando et al. | |
| 2002/0035575 A1 | 3/2002 | Taira et al. | |
| 2002/0110369 A1 | 8/2002 | Mori et al. | |
| 2002/0135608 A1 | 9/2002 | Hamada et al. | |
| 2002/0164152 A1 | 11/2002 | Kato et al. | |
| 2002/0176695 A1 | 11/2002 | Sawabe et al. | |
| 2003/0108338 A1 * | 6/2003 | Nonomura et al. | 386/95 |
| 2003/0138238 A1 | 7/2003 | Kashiwagi et al. | |
| 2003/0152371 A1 | 8/2003 | Gadre et al. | |
| 2003/0223735 A1 | 12/2003 | Boyle | |
| 2005/0002651 A1 * | 1/2005 | Ando et al. | 386/95 |

FOREIGN PATENT DOCUMENTS

| | | |
|---|---|---|
| EP | 1 191 536 A2 | 3/2002 |
| EP | 1 229 545 A2 | 8/2002 |
| JP | 2003-009090 A | 1/2003 |
| JP | 2006-507738 | 9/2006 |
| WO | WO-97/13364 | 4/1997 |

OTHER PUBLICATIONS

Japanese Office Action issued on Mar. 9, 2010, in counterpart Japanese Application No. 2006-502714 (2 pages).
European Search Report issued Jul. 5, 2011, in counterpart European Patent Application No. 04714039 (6 pages).
Canadian Office Action issued on Jun. 1, 2009, in counterpart Canadian Application No. 2,483,582.
European Examination Report dated Apr. 18, 2012, issued in counterpart European Patent Application No. 04 714 039.7; 7 pages.

* cited by examiner

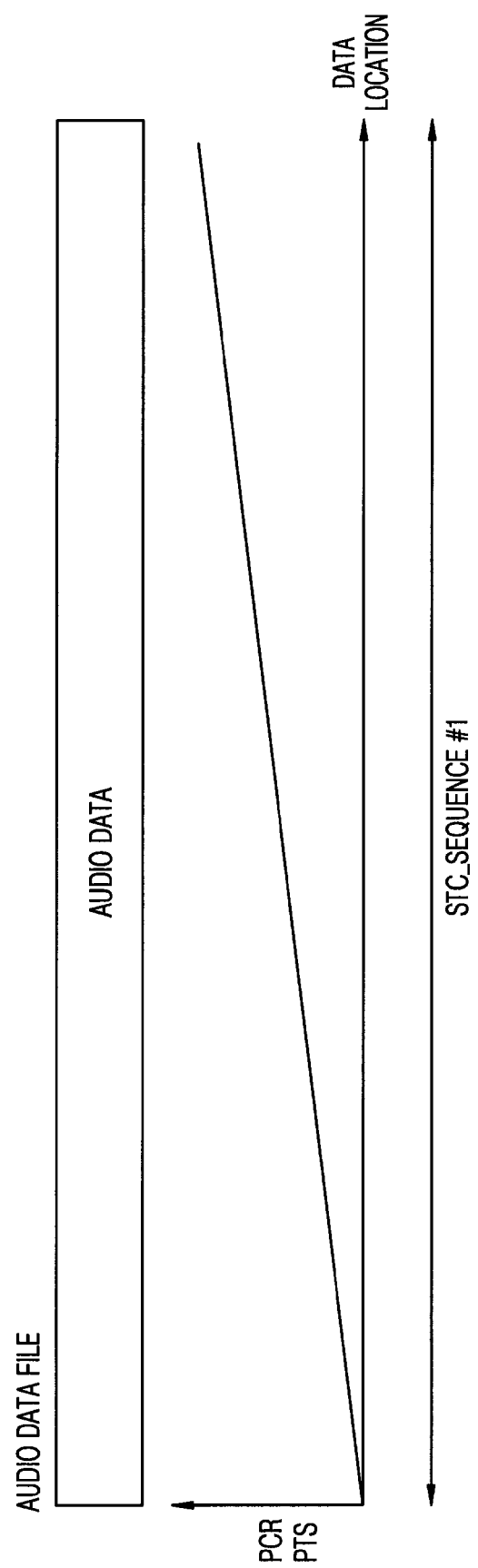

APPARATUS AND METHOD FOR DECODING DATA FOR PROVIDING BROWSABLE SLIDE SHOW, AND DATA STORAGE MEDIUM THEREFOR

CROSS-REFERENCE TO RELATED APPLICATIONS

This application is a continuation application of Ser. No. 10/937,502 filed on Sep. 10, 2004 now U.S. Pat No. 8,131,129, which is a continuation of application Ser. No. 10/783,038 filed Feb. 23, 2004 now U.S. Pat No. 8,103,145, which claims the priority of Korean Patent Application Nos. 2003-11520 and 2004-00059, filed on Feb. 24, 2003 and Jan. 2, 2004, respectively, in the Korean Intellectual Property Office, and U.S. Patent Application No. 60/452,559, filed on Mar. 7, 2003, in the U.S. Patent & Trademark Office, the disclosures of which are incorporated herein in their entirety by reference.

BACKGROUND OF THE INVENTION

1. Field of the Invention

The present invention relates to decoding data, and more particularly, to a decoding apparatus and method for providing a browsable slide show, and a data storage medium therefor.

2. Description of the Related Art

In general, image data contains a considerable amount of information, and thus, the image data needs to be compressed before being recorded on a recording medium or being transmitted. MPEG encoding that has been authorized by both ISO and IEC has been the most widely used method of compressing and encoding image data. Audio data, which is generally encoded together with image data, is compressed using an MPEG or audio coding phase 3 (AC-3) encoding method. Time information, necessary for synchronizing encoded image data with encoded audio data, is allotted to the encoded image data and the encoded audio data, and then the encoded image data and the encoded audio data are multiplexed.

In the case of multiplexing video data and audio data, the video data and the audio data are divided into video packets and audio packets, respectively. Each video or audio packet is an array of a predetermined number of bits. Thereafter, additional information, such as a header, is attached to each video packet and audio packet. Thereafter, the video packets and the audio packets are shuffled and then transmitted in a time-division manner. The header of each video and audio packet includes information indicating whether the corresponding packet is a video packet or an audio packet.

In MPEG synchronization, a time stamp, which comprises time information, is used. More specifically, the time stamp is a sort of time management tag attached to each access unit of video or audio data to facilitate decoding and reproducing of the video or audio data. In other words, the time stamp indicates when each access unit of the video or audio data should be decoded and reproduced. The time stamp is classified as either a presentation time stamp (PTS) or a decoding time stamp (DTS) according to which MPEG encoding method has been used to encode the video or audio data.

The PTS is time management information used in reproducing data. When the PTS matches a system time clock (STC) signal, which is a reference synchronization signal in a reference decoder of an MPEG system, the corresponding access unit is reproduced and output.

The DTS, which is time management information used in decoding data, is used because output sequences of bit arrays of MPEG-encoded video data are generally very unique. In other words, bit arrays of the MPEG-encoded video data are output in a predetermined order with "I" and "P" pictures followed by "B" pictures. Thus, a sequence of decoding the bit arrays of the MPEG-encoded video data should be different from a sequence of reproducing the bit arrays of the MPEG-encoded video data. If the PTS is different from the DTS, the PTS and the DTS are both loaded into packet data. Otherwise, only the PTS is loaded into the packet data.

FIG. 2 is a block diagram of an MPEG encoding apparatus 200. Referring to FIG. 2, the MPEG encoding apparatus 200 includes a video encoder 210, an audio encoder 220, a first packetizer 230, a second packetizer 240, a program stream multiplexer 250, and a transport stream multiplexer 260.

The video encoder 210 and the audio encoder 220 receive and encode digitalized video data and digitalized audio data, respectively.

The first and second packetizers 230 and 240 packetize the encoded video data and the encoded audio data, respectively, thus generating packetized elementary stream (PES) packets, respectively.

PTS information and DTS information are attached to the PES packet data. As described above, the PTS information and the DTS information are used to synchronize their corresponding image data with other data. The PTS information specifies the time when its corresponding image data will be output, and the DTS information specifies the time when its corresponding image data will be decoded. In general, audio data only has the PTS information, in which case the PTS information is the same as the DTS information. Audio data or video data, to which the PTS information and the DTS information are attached, is packetized into payload data.

The program stream multiplexer 250 and the transport stream multiplexer 260 multiplex the PES packets respectively obtained by the first and second packetizers 230 and 240 into a program stream (PS) and a transport stream (TS), respectively, with different identification numbers respectively allotted to the PES packets. A multiplexed unit of the program stream, which is used in a data storage medium, is a program stream pack. According to the DVD video standards, the program stream is multiplexed into program stream packs each comprised of 2048 bytes.

The transport stream is introduced for digital broadcasting applications in which data loss is more likely to occur. The transport stream is multiplexed into transport stream packs each comprised of 188 bytes. An increasing number of application programs that record digital broadcast data on a data storage medium have adopted transport streams. In the present invention, multiplexed transport streams are used. However, the present invention can also be applied to an application using program streams.

As described above, a transport stream is packetized data, which is obtained by packetizing video or audio data, and can be transmitted via a satellite, a cable network, or a local area network (LAN). According to the ISO/IEC 13818-1 standard, an MPEG-2 transport stream pack is comprised of 188 bytes. According to the ATM standard, an MPEG-2 transport stream pack is comprised of 53 bytes.

In a digital broadcast, a plurality of packet data is transmitted to a receiving party at irregular intervals. Once it arrives at the receiving party, each of the plurality of packet data is processed by a buffer of the receiving party and then is decoded by a decoder of the receiving party so that a user can watch a digital broadcast program. There is a need to reproduce the packet data at a user determined moment of time after the packet data is stored in a recording medium. A sending party is supposed to transmit the packet data to the receiving party with the state of the buffer of the receiving party taken into full consideration. However, if the sending party fails to transmit the packet data so that any two adjacent packet data among the plurality of packet data cannot be transmitted with a guaranteed sufficient time gap therebetween, there is a possibility of the buffer overflowing or underflowing with the packet data. Therefore, time information indicating the time when each of the plurality of packet data has arrived at a recording apparatus must be added to the packet data, and a reproducing apparatus must output the packet data by referring to the time information.

In recording packet data that has been transmitted in a transport stream on a recording medium and reproducing the packet data from the recording medium, "arrival time information" is necessary. In other words, a recording apparatus receives packet data that has been transmitted at regular intervals by a sending party. The recording apparatus stores the packet data on the recording medium. The recording apparatus includes a counter so as to transmit the packet data read from the recording medium to a decoder at the same intervals at which it has received the packet data. The counter is driven by a system clock signal with a frequency of 90 kHz or 27 MHz. Whenever each of the plurality of packet data arrives, the counter allots a counter value, i.e., an arrival time stamp (ATS), to each of the plurality of packet data, and the recording apparatus records each of the plurality of packet data with its counter value. In order to reproduce the packet data recorded on the recording medium, the counter transmits each of the plurality of packet data to the decoder by referring to the counter value of each of the plurality of packet data so that each of the plurality of packet data can be transmitted to the decoder at the same intervals at which it arrived at the counter. This type of counter is called an arrival time clock (ATC) counter. Therefore, data input into the recording apparatus is given an arrival time stamp and then is recorded together with the arrival time stamp on the recording medium. Thereafter, the data is reproduced from the recording medium by referring to the arrival time stamp attached thereto.

FIG. 3 illustrates a basic format of a plurality of packet data, to which arrival time stamps are respectively attached, and the relationship between the time when each of the plurality of packet data arrives and the time when each of the plurality of packet data is output to be reproduced. Referring to FIG. 3, a plurality of packet data A, B, C, and D sequentially arrive at a recording apparatus at moments of time represented by 100, 110, 130, and 150, respectively. The recording apparatus allots arrival time stamps having values of 100, 110, 130, and 150 to the plurality of packet data A, B, C, and D, respectively, and records the plurality of packet data A, B, C, and D with their respective arrival time stamps. When reproducing the plurality of packet data A, B, C, and D, the plurality of packet data A, B, C, and D are sequentially output at the moments of time represented by 100, 110, 130, and 150, respectively, by referring to their respective arrival time stamps.

FIG. 4 is a diagram illustrating the structure of packet data 400 recorded on a recording medium together with an arrival time stamp. The packet data 400 includes an arrival time stamp 410, a decoding time stamp 420, a presentation time stamp 430, and video data (or audio data) 440.

FIG. 5 is a block diagram of a conventional decoding apparatus that synchronizes video packet data with audio packet data using encoded time information, such as a PTS and a DTS. Referring to FIG. 5, the decoding apparatus includes an inverse multiplexer 510, a video decoder 530, an STC counter 550, and an audio decoder 570.

The inverse multiplexer 510 inversely multiplexes a transport stream input thereinto, transmits video packet data, which is obtained as a result of the inverse multiplexing, to the video decoder 530, and transmits audio packet data, which is obtained as a result of the inverse multiplexing, to the audio decoder 570.

The STC counter 550 is set by a program clock reference (PCR) included in the video packet data or the audio packet data. The video decoder 530 and the audio decoder 570 each include a decoding buffer (not shown), which temporarily stores packet data received from the inverse multiplexer 510. When the packet data including the PCR is input into the decoding buffer, an output value of the STC counter 550 is set to the same value as the PCR. The STC counter 550 can be realized as a counter that operates at a frequency of 90 kHz or 27 MHz.

The video packet data is input into the video decoder 530 by the STC counter 550 at a moment of time indicated by DTS information of the video packet data, and is then decoded by the video decoder 530. On the other hand, the audio packet data, which only includes PTS information, is input into the audio decoder 570 by the STC counter 550 at a moment of time indicated by the PTS information. Shortly after the audio packet data is input into the audio decoder 570, it is output.

In short, the video packet data or the audio packet data is decoded at the moment of time indicated by the DTS information of the video packet data or the PTS information of the audio packet data so that the decoding buffer filled with the video packet data or the audio packet data is emptied. Video data and audio data that have the same PTS data are output at the same time.

As described above, video data and audio data can be synchronized with each other by controlling the decoding and outputting of the video and audio data with reference to the DTS information of the video data and the PTS information of the audio data. The video data and the audio data are synchronized with each other by a clock signal provided by the STC counter 550.

One of the methods of displaying still images is a slide show, in which still images are displayed one after another each for a predetermined amount of time. There are two different types of slide shows, i.e., time-based slide shows and browsable slide shows. During a time-based slide show of still images, if a user selects a reverse play or forward play for reproduction of a specific previous or subsequent still image, reproduction of audio data corresponding to the current still image is stopped. Audio data corresponding to the specific previous or subsequent still image is then reproduced in synchronization with the specific previous or subsequent still image.

Hereinafter, the problem of discontinuous reproduction of audio data when a reverse play or forward play is selected during the displaying of still images in a time-based slide show will be described in greater detail with reference to FIG. 6. Mainstream data generally includes video data, audio data, or sub-picture data. A time-based slide show includes still image data but does not include audio data.

Referring to FIG. 6, each still image is synchronized with the corresponding sub-audio data using PTS information, which is encoding time information. As still images are reproduced, the STC counter value of the decoder gradually increases. However, if a user selects a forward play for reproduction of a specific subsequent still image, or if the user selects a reverse play for reproduction of a specific previous still image, the STC counter jumps to an exact count value corresponding to the specific subsequent still image. During this process, sub-audio data, such as background music, is discontinuously reproduced due to updating of the STC counter value of the decoder.

As described above, in the related art, a single STC counter is used to control both a video decoder and an audio decoder. Thus, in the case of displaying still images with background music in a time-based slide show, reproduction of sub-audio data, such as background music, discontinues whenever an STC counter value is updated because of a forward play command or a reverse play command issued by a user, which makes it very difficult to have a browsable slide show.

SUMMARY OF THE INVENTION

The present invention provides a decoding apparatus and method for providing a browsable slide show, and a recording medium for the decoding apparatus and method. The decoding apparatus and method can seamlessly reproduce sub-audio data in a browsable slide show regardless of whether a user selects a forward play or a reverse play in the middle of displaying still images.

Additional aspects and/or advantages of the invention will be set forth in part in the description which follows and, in part, will be obvious from the description, or may be learned by practice of the invention.

According to an aspect of the present invention, there is a decoding apparatus for providing a browsable slide show. The decoding apparatus includes a mainstream decoder, which decodes mainstream packet data including image data to be reproduced in the browsable slide show; a sub-audio decoder, which decodes sub-audio packet data including audio data attached to the image data; a mainstream system time clock (STC) counter, which provides an STC sequence for controlling the decoding time of the mainstream packet data in the mainstream decoder; and a sub-audio STC counter, which provides an STC sequence to control the decoding time of the sub-audio packet data in the sub-audio decoder.

The mainstream STC counter may provide an STC sequence for each still image included in the mainstream packet data to the mainstream decoder.

According to another aspect of the present invention, there is a decoding method for providing a browsable slide show. The decoding method involves providing an STC sequence for mainstream packet data, which is used for controlling the decoding time of the mainstream packet data, the mainstream packet data including image data to be reproduced in a browsable slide show; decoding the mainstream packet data by referring to the STC sequence for the mainstream packet data; providing an STC sequence for sub-audio packet data, which is used for controlling the decoding time of the sub-audio packet data, the sub-audio data including audio data attached to the image data; and decoding the sub-audio packet data by referring to the STC sequence for the sub-audio packet data.

When providing an STC sequence for mainstream packet data, an STC sequence for each still image included in the mainstream packet data may be provided.

According to still another aspect of the present invention, there is a data storage medium, which stores data to be reproduced in a browsable slide show. The data storage medium includes a plurality of clips, including image data; clip information, including clip information that specifies the structure of each of the clips; and a play list, including information on reproduction of each of the clips. Here, the clip information includes information on the STC sequence of each still image included in each of the clips.

Information on the STC sequence of each still image may include pieces of information relating to the location of each still image in each of the clips, as well as the reproduction starting time and the reproduction ending time of each still image.

The play list may include a plurality of play items, and each of the plurality of play items includes pieces of information on actual reproduction time and actual reproduction ending time of each still image.

BRIEF DESCRIPTION OF THE DRAWINGS

These and/or other aspects and advantages of the invention will become apparent and more readily appreciated from the following description of the embodiments taken in conjunction with the accompanying drawings in which:

FIG. 10B is a diagram illustrating STC sequences which are used to decode audio data according to an embodiment of the present invention;

DETAILED DESCRIPTION OF THE PREFERRED EMBODIMENTS

Figure 1:
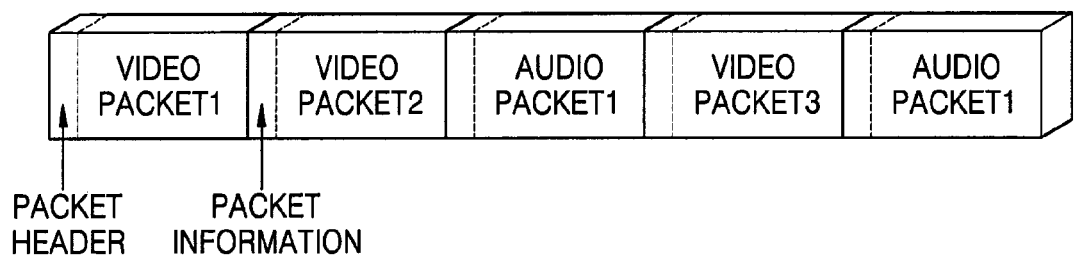
FIG. 1 is a diagram illustrating a conventional format of packet data.
Figure 2:
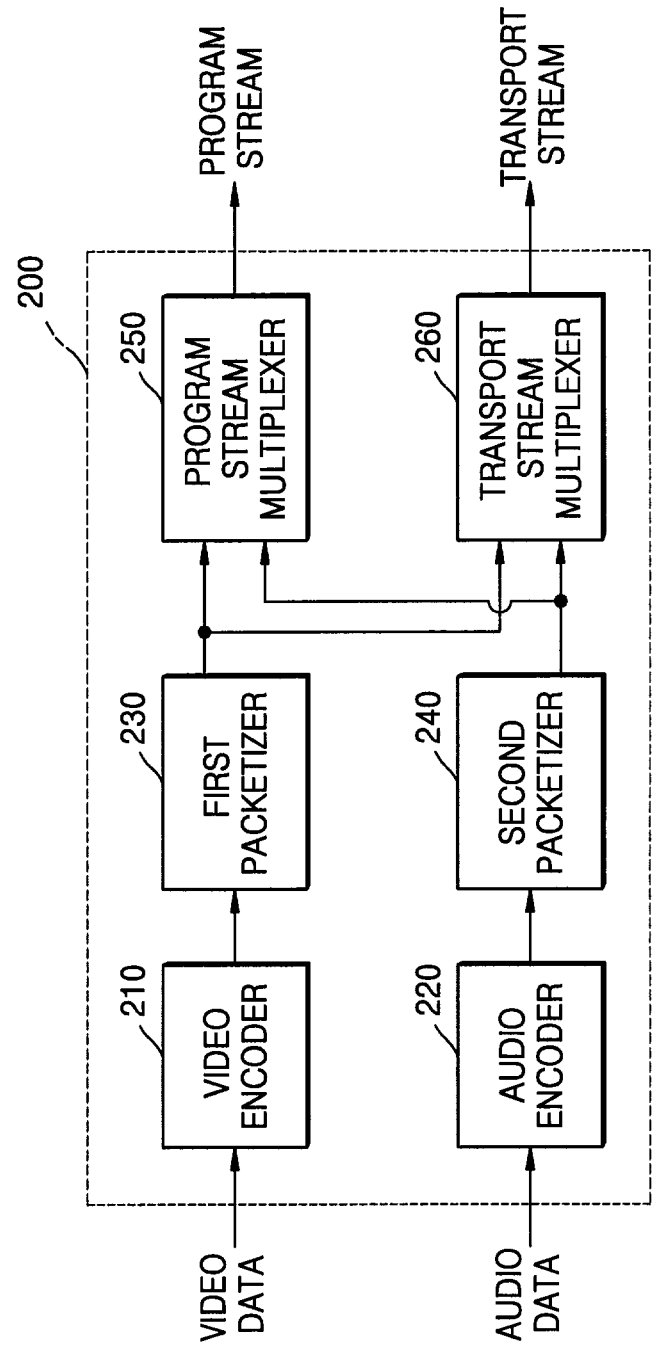
FIG. 2 is a block diagram of a conventional MPEG encoding apparatus.
Figure 3:
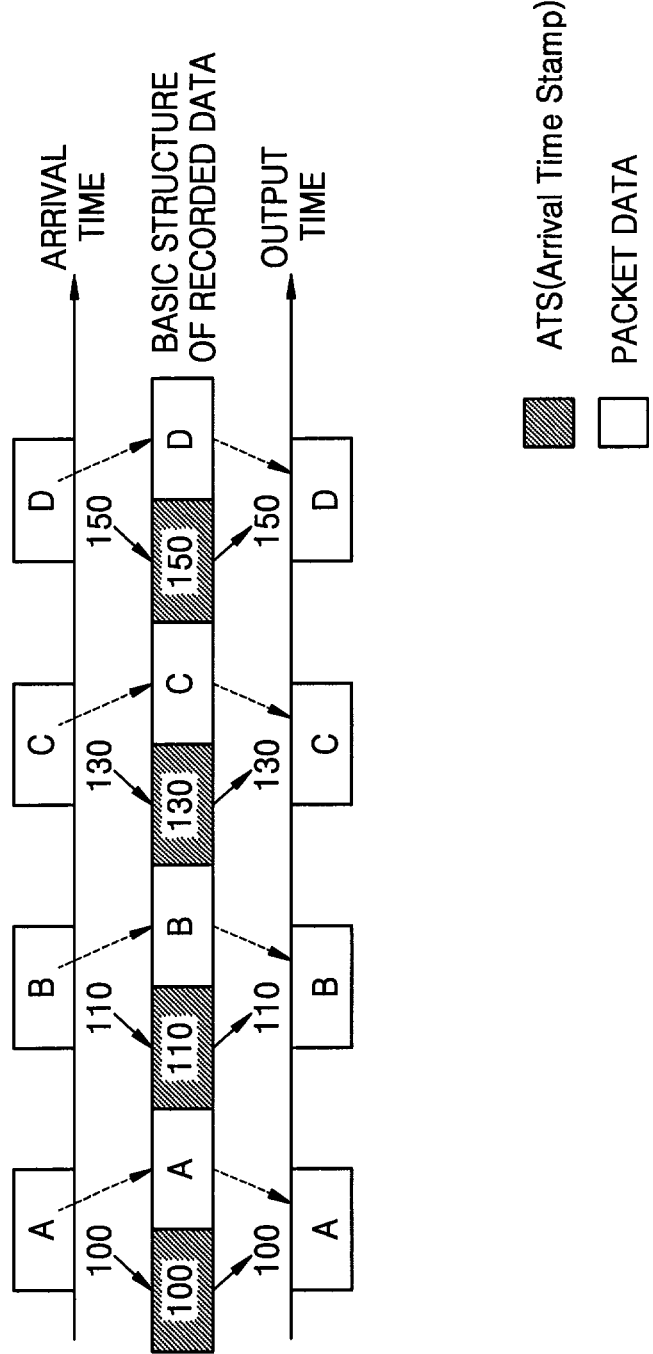
FIG. 3 is a diagram illustrating a basic format of a plurality of packet data, to which arrival time stamps are respectively attached, and relationship between the time when each of the plurality of packet data arrives and the time when each of the plurality of packet data is output to be reproduced.
Figure 4:
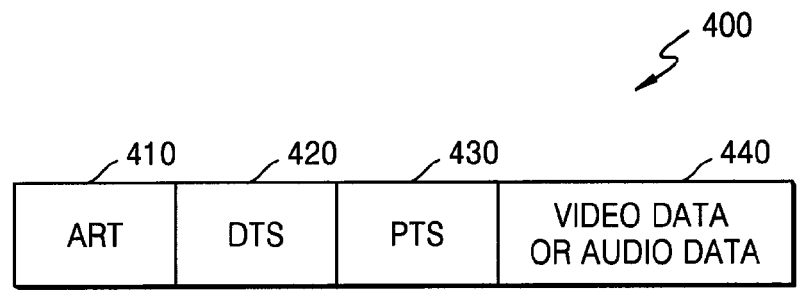
FIG. 4 is a diagram illustrating the format of conventional packet data with time synchronization information attached thereto.
Figure 5:
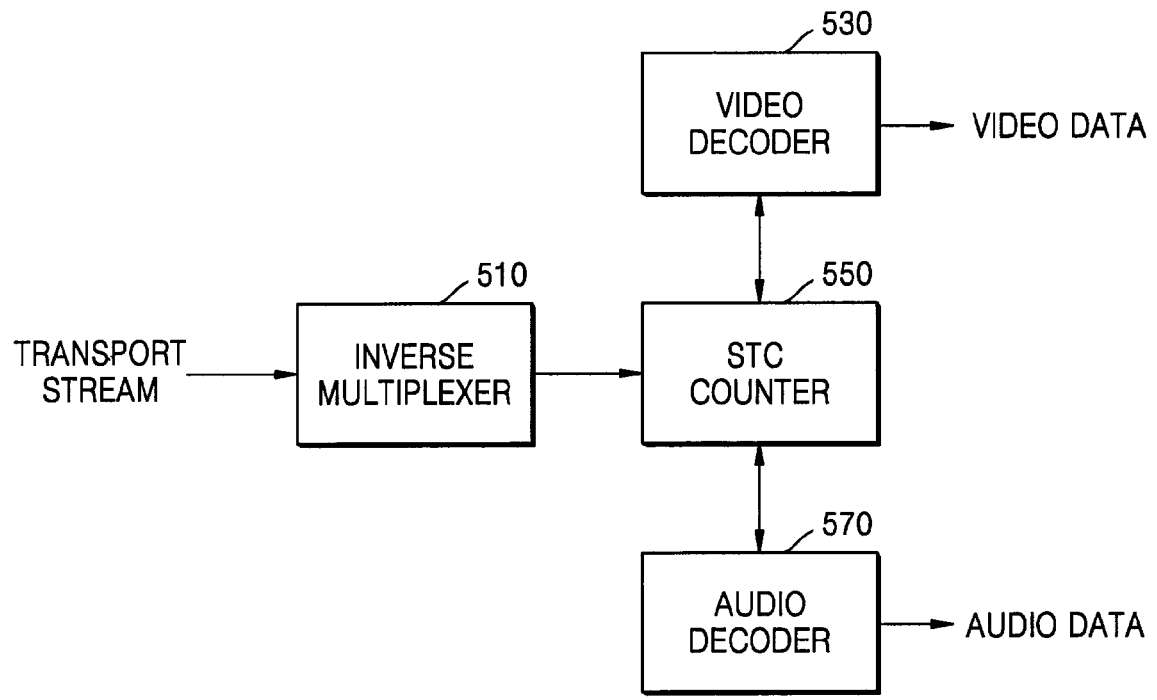
FIG. 5 is a block diagram of a conventional decoding apparatus.
Figure 6:
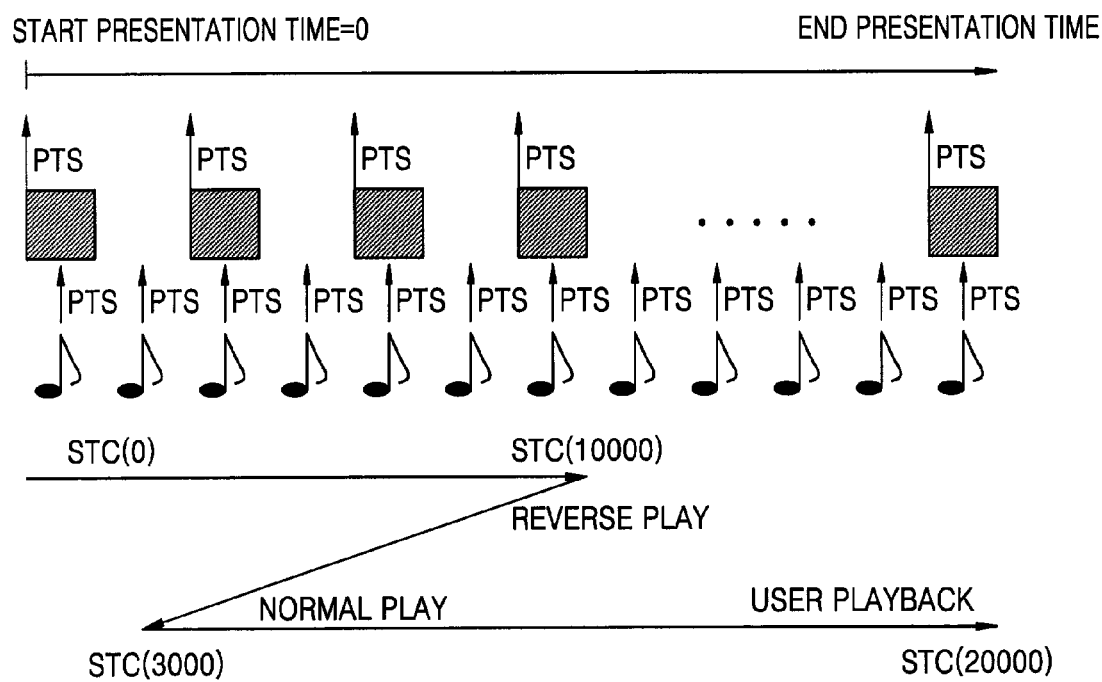
FIG. 6 is a diagram illustrating the updating of an STC counter value during the displaying of still images in a slide show.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 7:
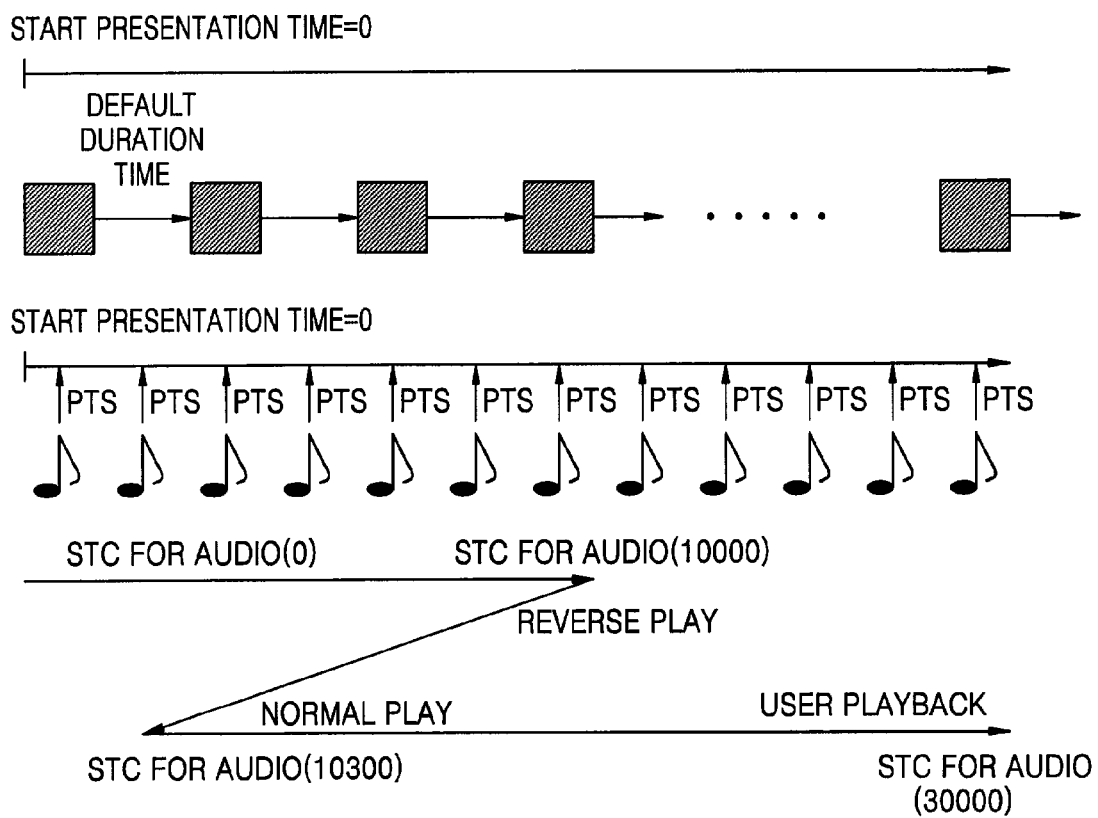
FIG. 7 is a diagram illustrating a browsable slide show according to an embodiment of the present invention.

FIG. 7 is a diagram illustrating a browsable slide show according to an embodiment of the present invention. Referring to FIG. 7, a first still image is reproduced at a predetermined moment of time designated by presentation time stamp (PTS) information with a predetermined default duration time. Other still images are then sequentially reproduced at regular intervals. In an aspect of the present invention, the default duration time is set to infinity. Thus, all the still images except the first one are reproduced according to user setting. Audio data attached to the still images for a browsable slide show is reproduced according to the PTS information attached thereto. If a user selects a reverse play or a forward play for reproduction of a predetermined still image during a browsable slide show, reproduction of the current still image is stopped, and the predetermined still image is reproduced, during which the audio data is seamlessly reproduced. This type of still image reproduction may include a digital photo album in which still images, such as photographs, are sequentially displayed with background music.

In order to realize a browsable slide show, a system time clock (STC) counter value for audio data should keep increasing independently of the STC counter value for still image data, as shown in FIG. 7.

Figure 8:
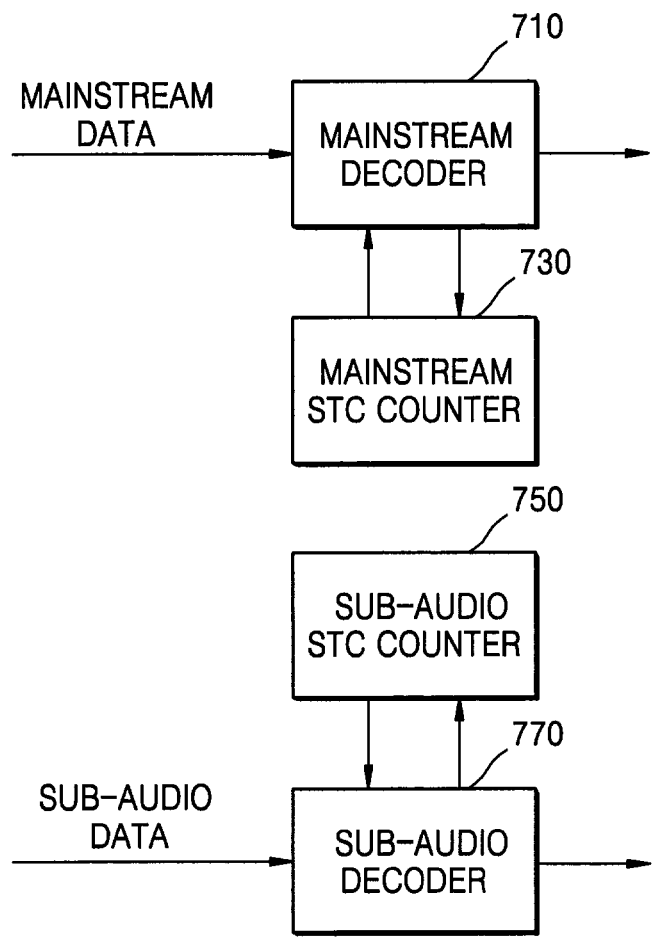
FIG. 8 is a block diagram of a decoding apparatus for providing a browsable slide show according to an embodiment of the present invention.

FIG. 8 is a block diagram of a decoding apparatus 700 that provides a browsable slide show according to an embodiment of the present invention. Referring to FIG. 8, the decoding apparatus includes a mainstream decoder 710, a mainstream STC counter 730, a sub-audio STC counter 750, and a sub-audio decoder 770.

Mainstream data is decoded by referring to a value of the mainstream STC counter 730, and sub-audio data is decoded by referring to a value of the sub-audio STC counter 750. Therefore, even if the value of the mainstream STC counter 730 is updated, it does not affect the value of the sub-audio STC counter 750 so that seamless reproduction of the sub-audio data is guaranteed even when a user selects a reverse play or a forward play of the mainstream data.

The mainstream data is input into the mainstream decoder 710, and the sub-audio data is input into the sub-audio decoder 770. The mainstream data is encoded data, such as a JPEG-encoded data stream or an MPEG-encoded data stream. If the mainstream data is an MPEG-encoded data stream, still images may be displayed on a screen using only intra frames.

For the convenience of explanation, it is assumed in the present embodiment that the mainstream data input into the mainstream decoder 710 is a JPEG-encoded data stream.

The sub-audio data input into the sub-audio decoder 770 is audio data, which is attached to the mainstream data so that it can be reproduced together with the mainstream data.

According to an aspect of the present invention, mainstream data and the sub-audio data are recorded on a data storage medium (not shown), such as a DVD, as separate files.

Figure 10A:
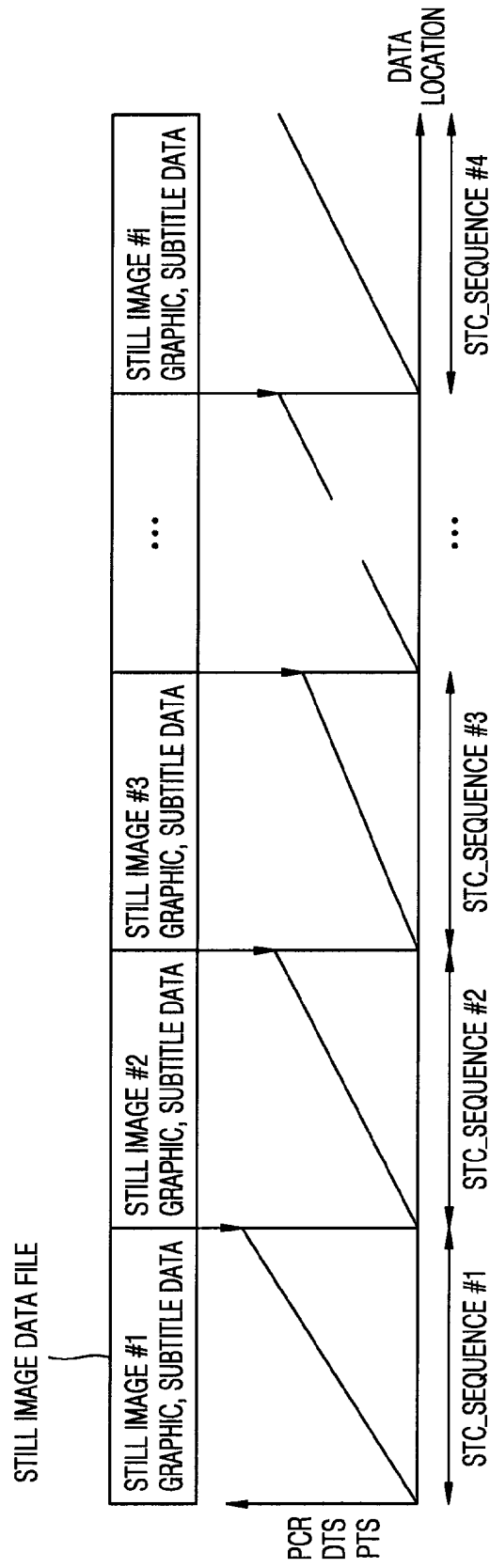
FIG. 10A is a diagram illustrating system time clock (STC) sequences which are used to decode still image data according to an embodiment of the present invention.

If a mainstream data packet is input into a buffer (not shown) installed in the mainstream decoder 710, an output value of the mainstream STC counter 730 is initialized to the same value as a program clock reference (PCR) value of the input mainstream data packet. Since the mainstream data is a JPEG-encoded data stream, still images of the mainstream data may have different PCR values. Thus, as shown in FIG. 10A, the still images have different STC sequences which are values output from the mainstream STC counter 730.

As described above, the mainstream decoder 710 decodes the input mainstream packet data by referring to an STC value provided by the mainstream STC counter 730.

According to an aspect of the present invention, the mainstream STC counter 730 operates at a frequency of 90 kHz or 27 MHz.

The operation of the sub-audio STC counter 750 is similar to that of the mainstream STC counter 730, and the operation of the sub-audio decoder 770 is similar to that of the mainstream decoder 710.

If a sub-audio data packet is input into a buffer (not shown) installed in the sub-audio decoder 770, an output value of the sub-audio STC counter 750 is initialized to the same value as a program clock reference (PCR) value of the input sub-audio data packet.

The sub-audio decoder 770 decodes the input sub-audio packet data by referring to an STC value provided by the sub-audio STC counter 750.

According to an aspect of the present invention, the sub-audio STC counter 750 operates at a frequency of 90 kHz or 27 MHz.

Figure 9:
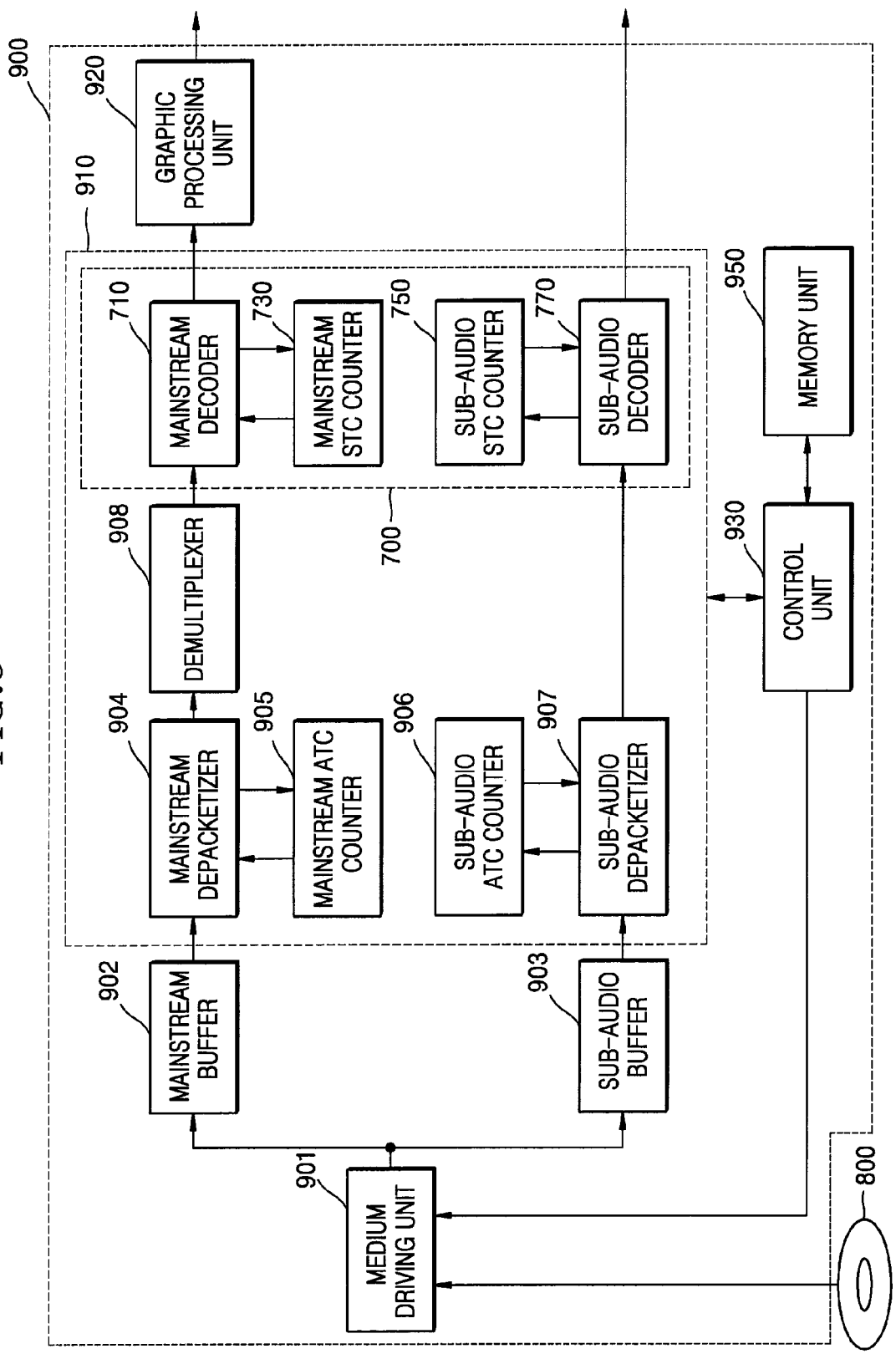
FIG. 9 is a block diagram of a reproducing apparatus that includes a decoding apparatus according to an embodiment of the present invention.

FIG. 9 is a block diagram of a reproducing apparatus 900, which includes a decoding apparatus according to an embodiment of the present invention. Referring to FIG. 9, the reproducing apparatus 900 comprises a medium driver 901, a mainstream buffer 902, a sub-audio buffer 903, a system decoder 910, a graphic processor 920, a controller 930, and a memory 950. The system decoder 910 includes the decoding apparatus 700 of FIG. 8, a mainstream depacketizer 904, a mainstream arrival time clock (ATC) counter 905, a sub-audio ATC counter 906, a sub-audio depacketizer 907, and a demultiplexer 908.

The medium driver 901 reads packet data with an arrival time stamp (ATS) attached thereto from a data storage medium 800. The medium driver 901 transmits mainstream packet data, including still image data, to the mainstream buffer 902 and transmits sub-audio data to the sub-audio buffer 903.

The mainstream packet data and the sub-audio data are stored in the data storage medium 800 as separate data files. According to an embodiment of the present invention, data is stored in the data storage medium 800 forming a specific structure, which will be described in greater detail later.

The mainstream depacketizer 904 receives the mainstream packet data from the mainstream buffer 902, depacketizes the received mainstream packet data, and transmits the depacketized data to the demultiplexer 908. The sub-audio depacketizer 907 determines an order, in which packets are to be output to the sub-audio decoder 770, by referring to an ATC reference value provided by the sub-audio ATC counter 906 and interpreting ATS information attached to each of the packets. Thereafter, the sub-audio depacketizer 907 outputs depacketized data, from which ATS information has been separated, to the sub-audio decoder 770.

The sub-audio ATC counter 906 provides the ATC reference value to the sub-audio depacketizer 907 so that the sub-audio depacketizer 907 can determine the order, in which the packets are to be transmitted to the sub-audio decoder 770 based on the ATC reference value. In other words, the sub-audio ATC counter 906 is initialized to a predetermined value, which is equal to an ATS value attached to first packet data input into the sub-audio depacketizer 907, and the sub-audio ATC counter 906 gradually increases its output value from the predetermined value. When the output value of the sub-audio ATC counter 906 reaches an ATS value attached to second packet data input into the sub-audio depacketizer 907, the sub-audio depacketizer 907 outputs a depacketized version of the second packet data.

The demultiplexer 908 demultiplexes mainstream data including decoding time stamp (DTS) information and presentation time stamp (PTS) information and sends the demultiplexed mainstream data to the mainstream decoder 710.

The controller 930 controls the reproducing apparatus 900 so that the reproducing apparatus 900 can reproduce data stored in the data storage medium 800. The memory 950 receives clip information and play list information, which are pieces of additional information read from the data storage medium 800, from the controller 930 and stores the received clip information and play list information, which will be described in greater detail later.

FIGS. 10A and 10B illustrate STC sequences, which are used for decoding still image data and audio data so that the still image data and the audio data can be reproduced in a browsable slide show manner. More specifically, FIG. 10A is a diagram illustrating STC sequences, which are used for decoding still image data, and FIG. 10B is a diagram illustrating an STC sequence, which is used for decoding audio data.

Referring to FIG. 10A, a plurality of still images are contained in a single still image data file. Each of the still images is encoded so that a PCR or PTS value of each of the still images can increase from "0".

Graphic data or subtitle data may be added to each of the still images so that the graphic data or the subtitle data can be reproduced together with each of the still images. The graphic data or the subtitle data has a PTS value that keeps increasing over time. For example, graphic data, such as animation, may be displayed on a still image with motion, or subtitle data, such as subtitles, may be output variably over time. Therefore, an initial value of encoding time information included in data regarding each of the still images may be set to 0. However, the ending time of the data regarding each of the still images cannot be determined in advance. The ending time of the data regarding each of the still images is determined according to ending time of the graphic data or subtitle data attached to each of the still images.

STC_sequence, which is an output of the mainstream STC counter 730 or the sub-audio STC counter 750, controls a decoding operation of the mainstream decoder 710 or the sub-audio decoder 770. STC_sequence is initialized by the PCR information included in each packet provided by the mainstream decoder 710 or the sub-audio decoder 770.

According to an aspect of the present invention, initial values of a still image, graphic data, or subtitle data that constitute still image data are all set to "0" at the very beginning of reproduction of the still image data, regardless of where in a still image data file the still image data is located, and thus STC_sequence is generated for each still image data. In order to find each still image data in the still image data file, information on the very beginning of STC_sequence of each still image data is used.

Audio data may or may not be attached to each still image data to be displayed in a slide show. In the case of still image data with audio data attached thereto, the audio data is preferably recorded in an audio file with a PCR so that an STC value can gradually increase. As shown in FIG. 10B, the sub-audio STC counter 750 generates only one STC sequence STC_sequence.

According to an aspect of the present invention, still image data, including a plurality of still images, constitutes one recording unit called a 'clip'. In addition, recording structure information called 'clip information' is attached to each clip. Clip information for a still image includes sequence information, which is a set of pieces of information on an STC sequence STC_sequence, corresponding to the still image. The sequence information includes a starting point of the STC sequence STC_sequence, the presentation start time (PST), and the presentation end time (PET).

As described above, the PST can be determined in advance. For example, the PST can be set to a very small value, such as 0 or 1/30 sec. The PST of a still image is preferably the same as a PTS value of the still image. The PET represents the end of running time of graphic data or subtitle data associated with the still image data. For example, in a case where still image data includes invariable data, which is attached to a still image so that it can be output together with the still image, the PET of the still image data can be set to the same value as the duration of one frame image. On the other hand, if the still image data includes variable data, such as subtitles variably output over 10 seconds, for example, then the PET of the still image data is set to a value obtained by adding 10 seconds to the duration of one frame image. In the present invention, the PET is set to infinity. For example, the PET can be set to 0 or any greatest number conceivable under given circumstances (e.g., 0xFFFFFFFF in a 32-bit representation manner).

According to an aspect of the present invention, a play list, which is additional information related to the reproduction of still image data, such as a reproduction sequence or default reproduction time, is further recorded on the data storage medium 800, and the still image data is reproduced by referring to the play list recorded on the data storage medium 800.

Figure 11:
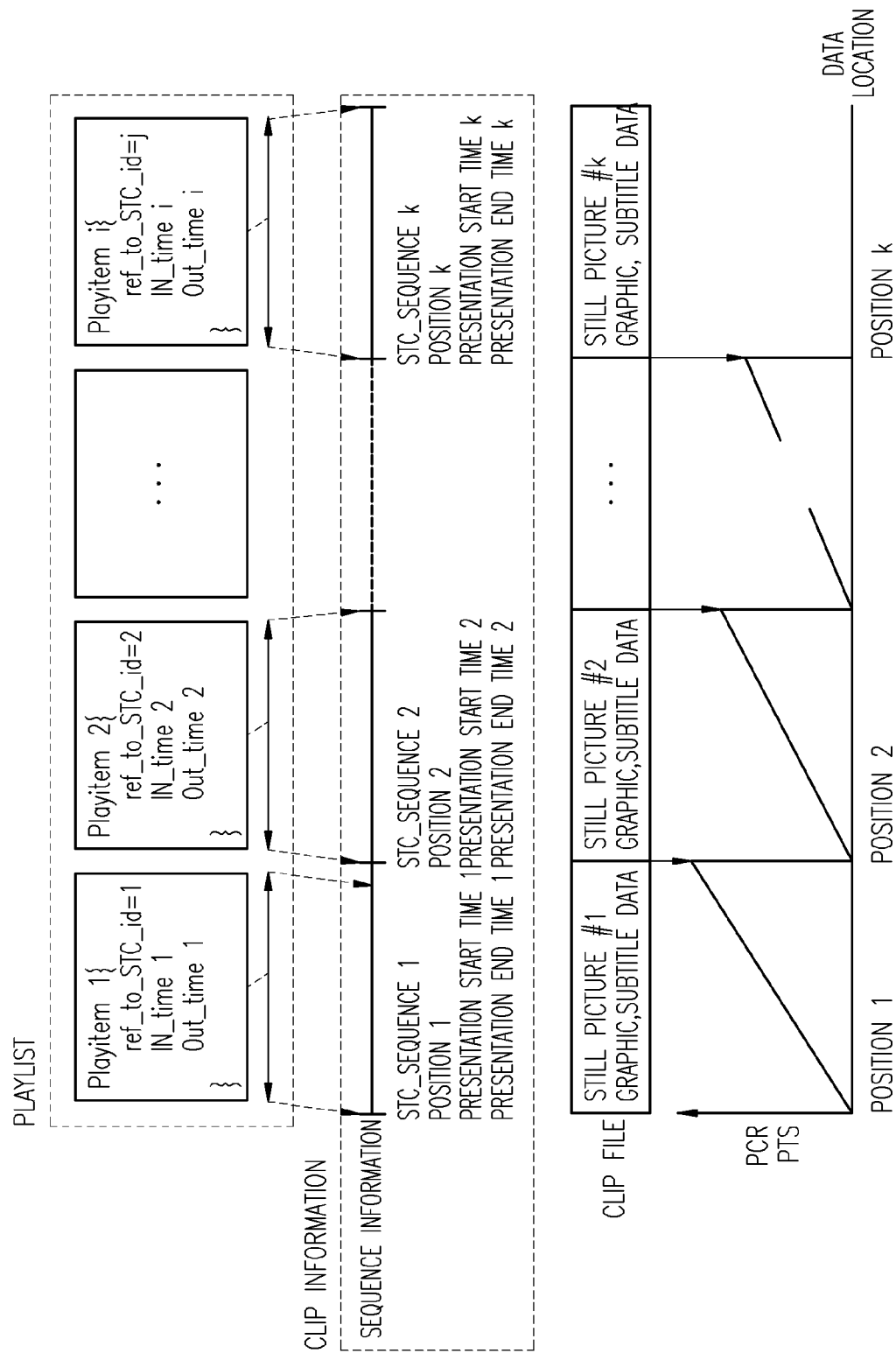
FIG. 11 is a diagram illustrating the relationship among a play list, clip information, and clips.

FIG. 11 illustrates the relationship among a play list, clip information, and a clip. Referring to FIG. 11, the play list includes a plurality of play items. A sequence among the plurality of play items corresponds to an order for reproducing the plurality of play items, and each of the plurality of play items corresponds to a still image. Each of the plurality of play items has various pieces of information, such as Clip_Information_file_name, ref_to_STC_id, IN_time, and Out_time.

The Clip_Information_file_name indicates a file name of clip information, i.e., additional information on a structure of a clip file, in which a still image designated by each of the play items is recorded. The ref_to_STC_id is identification information that specifies STC_sequence in the clip file. As described above, a plurality of still images are recorded in one clip in a predetermined order, and thus a serial number of each of the plurality of still images can be used as an identification number for each of the plurality of still images.

The IN_time indicates a predetermined moment of time between the presentation_start_time and the presentation_end_time of the STC_sequence. According to an aspect of the present invention, the IN_time and the presentation_start_time of a still image are set to the same value. If the still image has been MPEG-encoded into an intra picture and a sequence end code, the IN_time and the presentation_start_time of the still image must indicate the same moment of time. The Out_time could also be any moment of time between the presentation_start_time and presentation_end_time of the STC_sequence but should be set to a larger value than that of the IN_time. The Out_time is preferably set to the same value as the presentation_end_time. However, the Out_time could be prior to the presentation_end_time. In a case where the Out_time is prior to the presentation_end_time, only data in a range between the presentation_start_time and the Out_time of a corresponding play item is reproduced. The present embodiment of the present invention, especially, regarding the In_time and the Out_time is applicable to not only still image data but also motion picture data, which is very desirable.

Figure 12:
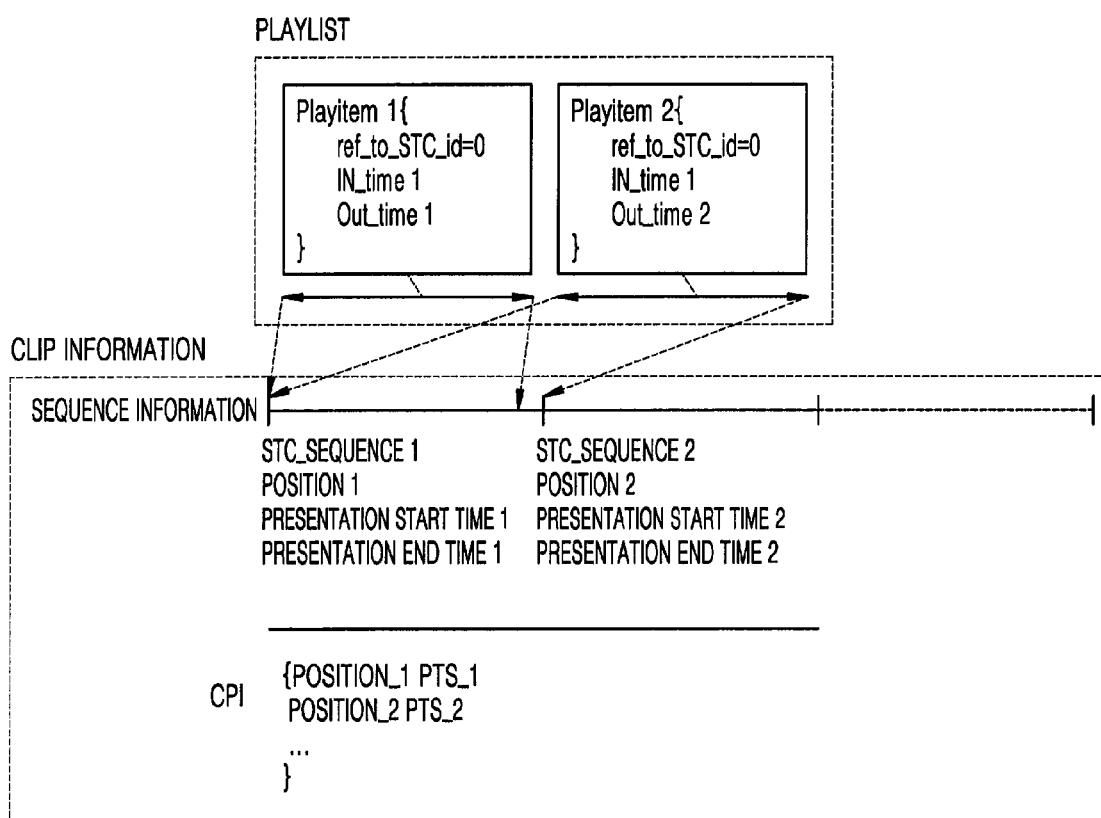
FIG. 12 is a diagram illustrating a plurality of play items with different default reproduction times.

According to an aspect of the present invention, the above mentioned variables are very useful especially when the presentation_end_time indicates an infinite moment of time. In other words, if the ending time of a still image is set to infinity, the still image can be reproduced in different play times at different default reproduction moments of time, as shown in FIG. 12, by allowing each of the different play items to have a value required for controlling actual output time of the still image. The Out_time, like the presentation_end_time, can be set to infinity, in which case, the Out_time is represented by 0 or any greatest number conceivable under given circumstances. Accordingly, in the case of reproducing still image data with reproduction time set to infinity, if a user inputs a command regarding a reproduction operation mode, such as a reverse play or forward play, reproduction of a current still image may be stopped, and then a still image desired by the user is reproduced.

Figure 13:
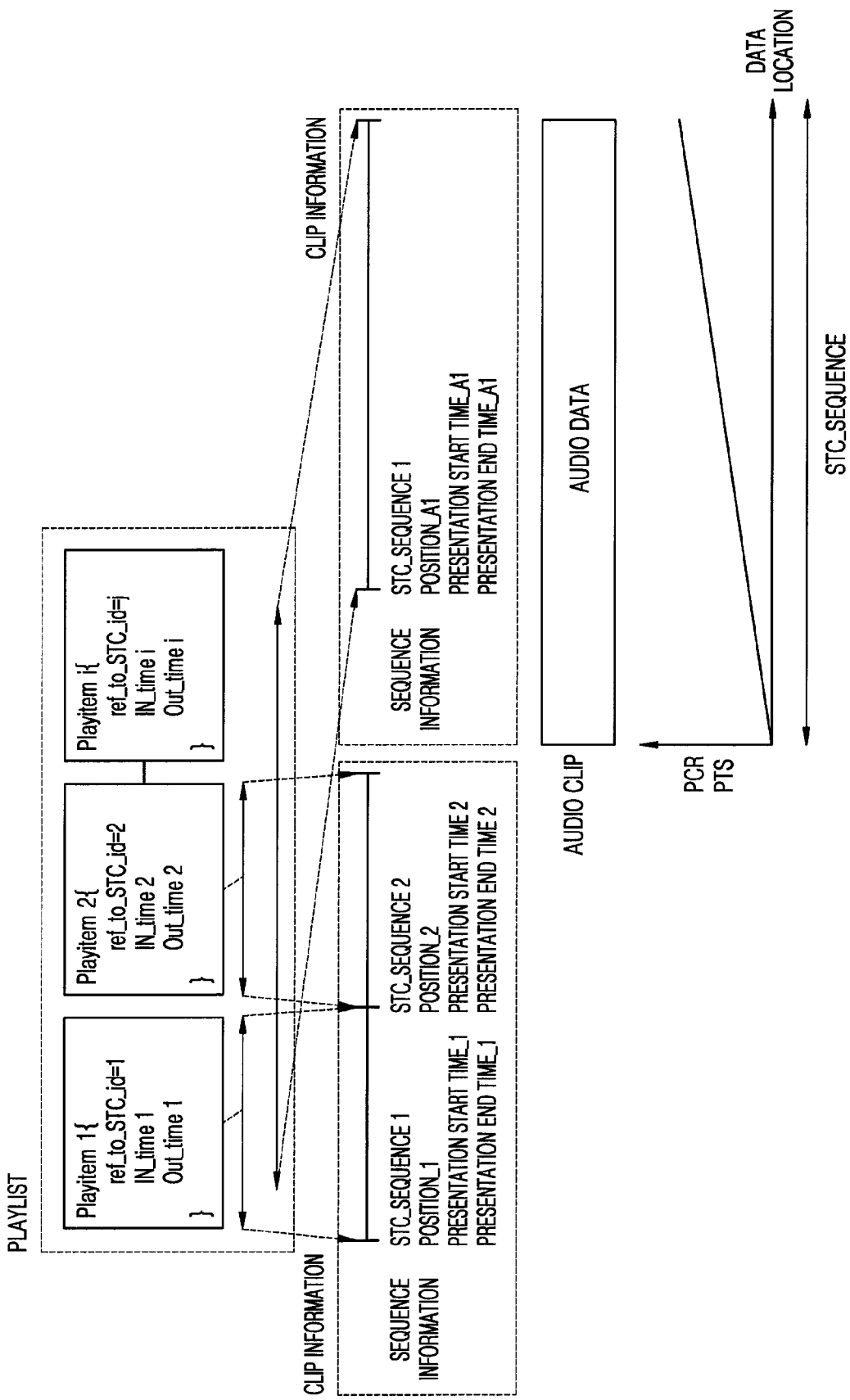
FIG. 13 is a diagram illustrating a play list including sub-play items.

FIG. 13 illustrates a play list including sub-play items. Referring to FIG. 13, a play list includes PlayItem1, PlayItem2, and SubPlayItem1. The In_time of SubPlayItem1 is the same as the In_of PlayItem1, and the Out_time of SubPlayItem1 is the same as the Out_time of PlayItem2.

Figure 14:
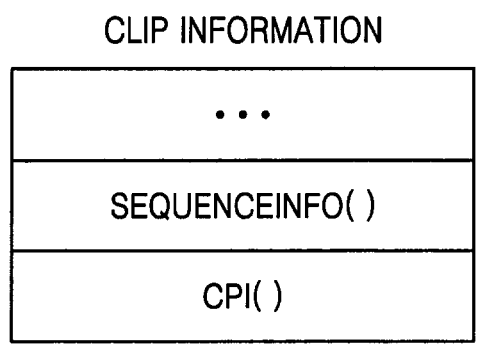
FIG. 14 is a diagram illustrating the structure of clip information.

FIG. 14 illustrates the structure of clip information, which specifies the structure of a recording unit, i.e., a clip. The clip information includes SequenceInfo and characteristic point information (CPI).

Figure 15:
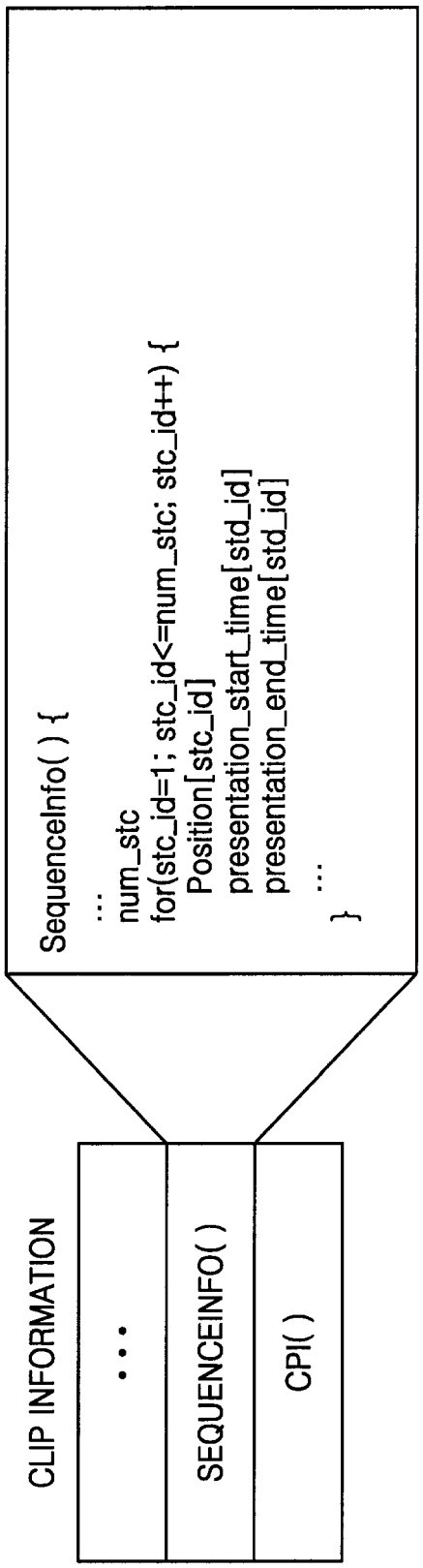
FIG. 15 is a diagram illustrating an example of the SequenceInfo of FIG. 14.

FIG. 15 illustrates an example of the SequenceInfo of FIG. 14. Referring to FIG. 15, the SequenceInfo includes num_stc information, which indicates the number of STC sequences (STC_sequence) in a predetermined clip, the Position, the presentation_start_time, and the presentation_end_time of each of the STC sequences in the predetermined clip. Here, the Position indicates the location of each of the STC sequences in the predetermined clip. This structure of the SequenceInfo can also be directly applied to motion picture data.

Figure 16:
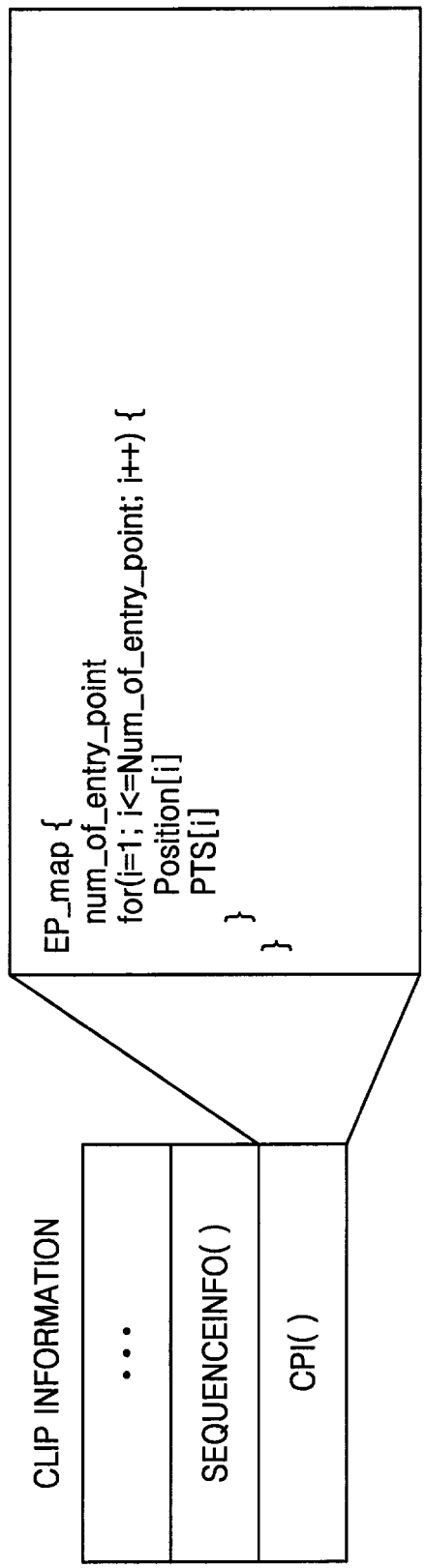
FIG. 16 is a diagram illustrating an example of characteristic point information (CPI) of FIG. 14.

FIG. 16 illustrates an example of the CPI of FIG. 14. Referring to FIG. 16, the CPI includes an EP_map, which is additional information on an entry point of a predetermined clip. For example, in an MPEG encoding method, an entry point indicates the beginning of an image that is encoded as an intra picture. In an aspect of the present invention, however, each still image data itself becomes an entry point if each still image data is realized as an MPEG intra picture and a sequence end code.

The EP_map includes the num_of_entry_point, which indicates the number of entry points in the predetermined clip, and the Position and the PTS value of each of the entry points in the predetermined clip. In the case of still image data, the Position and the PTS value of an entry point correspond to the Position and the presentation_start_time, respectively, of a corresponding STC sequence, so the CPI is not necessary. However, in the case of motion picture data, the CPI is necessary for random searches.

In the reproducing apparatus shown in FIG. 9, the medium driver 901 reads clip information and play list information from the data storage medium 800 and transmits them to the controller 930. Then, the controller 930 temporarily stores the clip information and the play list information in the memory 950. The controller 930 searches the memory 950 for information on a list of play items desired to be reproduced (i.e., play item information) and analyzes pieces of information on the play items. The controller 930 locates a desired still image and a corresponding audio file by referring to the clip information and reads the desired still image and the corresponding audio file from the medium driver 901.

Still image data is stored in the mainstream buffer 902, and audio data is stored in the sub-audio buffer 903. Then, the still image data and the audio data are input into the system decoder 910. Since it includes the sub-audio STC counter 750, the system decoder 910 can seamlessly reproduce the audio data even when a forward or reverse play is performed in the middle of a browsable slide show in response to a command issued by a user.

The present invention can be realized as a computer-readable code written on a computer-readable recording medium. The computer-readable recording medium includes all kinds of recording devices on which data can be written in a computer-readable manner, such as a ROM, a RAM, a CD-ROM, a magnetic tape, a floppy disk, an optical data storage, and a carrier wave (e.g., data transmission through the Internet). The computer-readable recording medium can be distributed over a plurality of computer systems connected to one another in a network, in which case, computer-readable codes can be stored in and executed from the computer-readable recording medium in a decentralized manner.

As described above, according to the present invention, it is possible to seamlessly reproduce sub-audio data even when a user selects a forward or reverse play in the middle of reproducing still image data with the sub-audio data attached thereto in a browsable slide show.

Although a few embodiments of the present invention have been shown and described, it would be appreciated by those skilled in the art that changes may be made in this embodiment without departing from the principles and spirit of the invention, the scope of which is defined by the claims and their equivalents.

What is claimed is:

1. A decoding method for reproducing data from an optical disc to provide a browsable slide show, the decoding method comprising:
   reading, from the optical disc, a playlist comprising a playitem that provides a main presentation of the playlist and a subplayitem that provides an auxiliary presentation associated with the main presentation;
   reading, from the optical disc, mainstream data corresponding to the playitem and sub-audio data corresponding to the subplayitem using the playlist;
   generating a first system time clock sequence for the mainstream data to control the decoding time of the mainstream data;
   decoding the mainstream data according to the first system time clock sequence for the mainstream data;
   generating a second system time clock sequence for the sub-audio data to control the decoding time of the sub-audio data; and
   decoding the sub-audio data according to the second system time clock sequence for the sub-audio data, the second system time clock sequence being independent of the first system time clock sequence,
   wherein
   a sub-audio data presentation is not synchronized with a mainstream data presentation,
   the generating of the first system time clock sequence for the mainstream data comprises determining an initial value of the first system time clock sequence for the mainstream data based on a program clock reference included in the mainstream data, and
   the generating of the second system time clock sequence for the sub-audio data comprises determining an initial value of the second system time clock sequence for the sub-audio data based on a program clock reference included in the sub-audio data.

* * * * *